(12) United States Patent
Kobayashi et al.

(10) Patent No.: US 10,872,608 B2
(45) Date of Patent: *Dec. 22, 2020

(54) VOICE OUTPUT SYSTEM, VOICE OUTPUT METHOD, AND PROGRAM STORAGE MEDIUM

(71) Applicant: Toyota Jidosha Kabushiki Kaisha, Toyota (JP)

(72) Inventors: Hideki Kobayashi, Miyoshi (JP); Akihiro Muguruma, Nagoya (JP); Yukiya Sugiyama, Toyota (JP); Shota Higashihara, Chiryu (JP); Riho Matsuo, Nagoya (JP); Naoki Yamamuro, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 67 days.

This patent is subject to a terminal disclaimer.

(21) Appl. No.: 16/242,351

(22) Filed: Jan. 8, 2019

(65) Prior Publication Data

US 2019/0214007 A1    Jul. 11, 2019

(30) Foreign Application Priority Data

Jan. 11, 2018    (JP) .................................. 2018-002758

(51) Int. Cl.
*G10L 15/00*    (2013.01)
*G10L 15/22*    (2006.01)
(Continued)

(52) U.S. Cl.
CPC .............. *G10L 15/22* (2013.01); *B60K 35/00* (2013.01); *G01C 21/3608* (2013.01);
(Continued)

(58) Field of Classification Search
CPC .......... G10L 15/22; H04W 4/46; B60K 35/00; G01C 21/3608; G01C 21/3629;
(Continued)

(56) References Cited

U.S. PATENT DOCUMENTS 7,856,311 B2 *  12/2010  Matsuura ........... G01C 21/3679
                                                                        701/540
2012/0173245 A1 *  7/2012  Miyahara ............. G09B 29/106
                                                                        704/275
(Continued)

FOREIGN PATENT DOCUMENTS

JP    2004-272355 A    9/2004
JP    2009-300537 A    12/2009
(Continued)

OTHER PUBLICATIONS

Notice of Allowance dated Aug. 31, 2020 in U.S. Appl. No. 16/054,509.

*Primary Examiner* — Md S Elahee
(74) *Attorney, Agent, or Firm* — Dinsmore & Shohl LLP (57) ABSTRACT

Each of plural dialogue devices generates proposition information that is an utterance indicating a proposition for passengers who are on board plural vehicles, based on an utterance submitted by a passenger and current destination information and past destination information. The dialogue device transmits the generated proposition information to other dialogue device.

4 Claims, 9 Drawing Sheets

(51) Int. Cl.
  *G06F 3/16* (2006.01)
  *H04W 4/46* (2018.01)
  *G08G 1/00* (2006.01)
  *G01C 21/36* (2006.01)
  *B60K 35/00* (2006.01)

(52) U.S. Cl.
  CPC ..... *G01C 21/3629* (2013.01); *G01C 21/3697* (2013.01); *G06F 3/165* (2013.01); *G06F 3/167* (2013.01); *G08G 1/22* (2013.01); *H04W 4/46* (2018.02); *B60K 2370/148* (2019.05); *G10L 2015/223* (2013.01)

(58) Field of Classification Search
  CPC ..... G01C 21/3697; G06F 3/165; G06F 3/167; G08G 1/22
  USPC ................................. 704/235, 275; 701/540
  See application file for complete search history.

(56) References Cited

U.S. PATENT DOCUMENTS

| | | |
|---|---|---|
| 2016/0180853 A1 | 6/2016 | VanLund et al. |
| 2017/0083285 A1 | 3/2017 | Meyers et al. |

FOREIGN PATENT DOCUMENTS

| | | |
|---|---|---|
| JP | 2010-217318 A | 9/2010 |
| JP | 2012-133530 A | 7/2012 |
| JP | 2016-006607 A | 1/2016 |

\* cited by examiner

ND PROGRAM STORAGE
VOICE OUTPUT SYSTEM, VOICE OUTPUT METHOD, AND PROGRAM STORAGE MEDIUM

CROSS-REFERENCE TO RELATED APPLICATION

This application claims priority under 35 USC 119 from Japanese Patent Application No. 2018-002758 filed on Jan. 11, 2018, the disclosure of which is incorporated by reference herein in its entirety.

BACKGROUND

Technical Field

The present disclosure relates to a voice output system, a voice output method, and a program storage medium.

Related Art

Conventionally, voice operation systems each of which operates by voice an in-vehicle device without putting an excessive processing load on the in-vehicle device have been known. For example, see Japanese Patent Application Laid-Open (JP-A) No. 2009-300537. A voice operation system disclosed in JP-A No. 2009-300537 is configured in such a way that a mobile terminal recognizes a voice and transmits a result of the recognition to an in-vehicle device and the in-vehicle device controls operation of the in-vehicle device itself, based on the transmitted recognition result.

However, a technology described in JP-A No. 2009-300537 does not take into consideration a case in which information is shared among plural vehicles. For example, when plural vehicles head to the same destination, it may be that the plurality of vehicles share proposition information about a place to be visited and the like existing on the way to the destination

SUMMARY

The present disclosure provides a voice output system, a voice output method, and a program storage medium that are capable of appropriately sharing proposition information for passengers who are on board plural vehicles among the plurality of vehicles the destinations of which correspond to one another.

A voice output system according to a first aspect of the present disclosure is a voice output system including plural voice output devices that are interconnected via a network, in which each of the plural voice output devices is mounted in a different one of plural vehicles, and each of the plural voice output devices includes (i) an utterance acquisition unit that acquires an utterance from a passenger who is on board one of the plural vehicles, (ii) a generation unit that generates proposition information that is an utterance indicating a proposition for respective passengers who are on board the plural vehicles, based on the utterance acquired by the utterance acquisition unit and at least one of current destination information or past destination information of the plural vehicles, (iii) a first output unit that outputs the proposition information generated by the generation unit, (iv) a transmission unit that transmits the proposition information generated by the generation unit to other voice output devices that is mounted in a vehicle, which has a common current destination information, (v) a reception unit that receives proposition information transmitted from other voice output device, and (vi) a second output unit that outputs the proposition information received by the reception unit.

In the voice output system of the first aspect, each of plural voice output devices is mounted in a different one of plural vehicles and generates proposition information that is an utterance indicating a proposition for passengers who are on board the plurality of vehicles, based on an utterance from a passenger and at least either current destination information of the one of the plurality of vehicles or past destination information of the one of the plurality of vehicles; The generated proposition information is transmitted to other voice output devices that are mounted in vehicles, which has a common current destination information. This configuration enables proposition information for passengers who are on board plural vehicles to be shared appropriately among the plurality of vehicles the destinations of which correspond to one another.

A voice output system according to a second aspect of the present disclosure, in the first aspect, further includes a further voice output device that is installed at a place different from the plurality of vehicles, in which the utterance acquisition unit in the further voice output device acquires an utterance from a user in a vicinity of the further voice output device.

The second aspect further includes a further voice output device that is installed at a place different from the plurality of vehicles, and the utterance acquisition unit in the voice output device acquires an utterance from a user in a vicinity of the voice output device. Generated proposition information is output from plural voice output devices. This configuration enables information to be shared appropriately between a user at a remote place and passengers in the vehicles.

A program storage medium according to a third aspect of the present disclosure is a non-transitory storage medium storing a program that is executed in each of plural voice output devices each of which is mounted in a different one of plural vehicles and a storage medium storing a program causing a computer to perform processing including (i) acquiring an utterance from a passenger who is on board one of the plural vehicles, (ii) generating proposition information that is an utterance indicating a proposition for respective passengers who are on board the plural vehicles, based on the utterance acquired by an utterance acquisition unit and at least one of current destination information or past destination information of the plural vehicles, (iii) outputting the proposition information generated by the generation unit, (iv) transmitting the generated proposition information to other voice output device that is mounted in a vehicle, which has a common current destination information, (v) receiving the proposition information transmitted from one of the other voice output device, and (vi) outputting the proposition information.

A voice output method according to a fourth aspect of the present disclosure is a voice output method that is performed in each of plural voice output devices each of which is mounted in a different one of plural vehicles and a voice output method including (i) acquiring an utterance from a passenger who is on board one of the plural vehicles, (ii) generating proposition information that is an utterance indicating a proposition for respective passengers who are on board the plural vehicles, based on the acquired utterance and at least one of current destination information or past destination information of the plural vehicles, (iii) outputting the generated proposition information, (iv) transmitting the generated proposition information to other voice output device that are mounted in a vehicle, which has a common current destination information, (v) receiving proposition information transmitted from the other voice output device, and (vi) outputting the received proposition information.

As described above, the present disclosure enables proposition information for passengers who are on board plural vehicles to be shared appropriately among the plurality of vehicles the destinations of which correspond to one another.

BRIEF DESCRIPTION OF THE DRAWINGS

Exemplary embodiments of the present disclosure will be described in detail based in the following figures, wherein.

DETAILED DESCRIPTION

First Embodiment

Hereinafter, a voice output system according to a first embodiment will be described using the drawings.

<Voice Output System>

Figure 1:
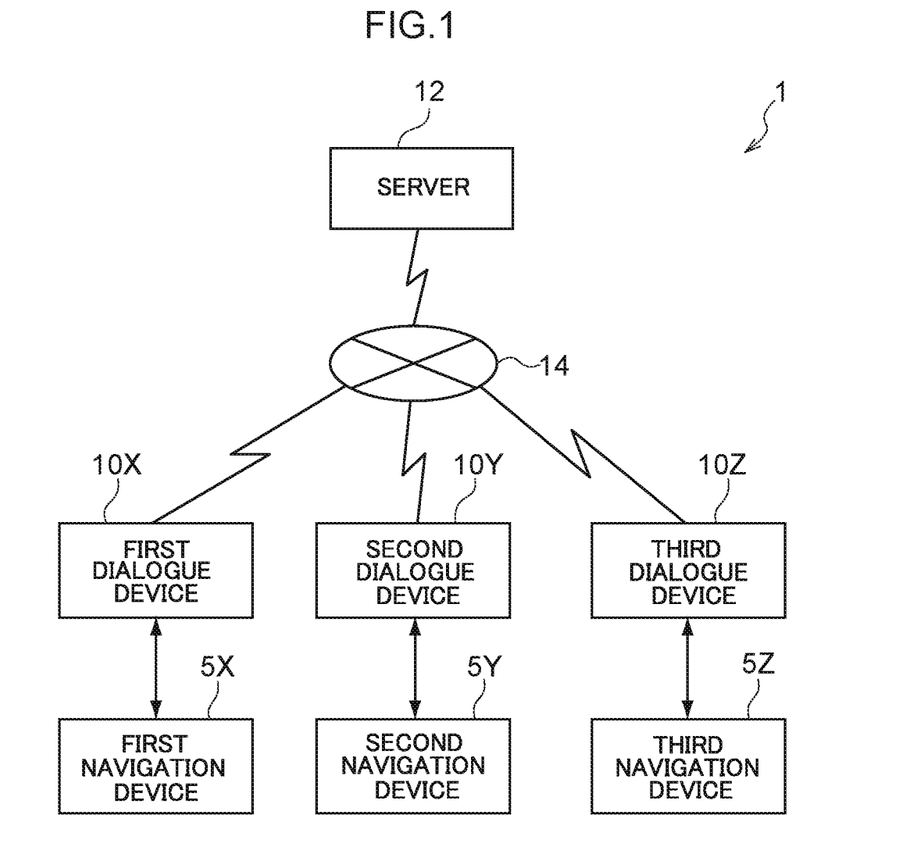
FIG. 1 is a schematic block diagram of a voice output system according to a first embodiment.

FIG. 1 is a block diagram illustrating an example of a configuration of a voice output system 1 according to the first embodiment. As illustrated in FIG. 1, the voice output system 1 includes a first navigation device 5, a second navigation device 5Y, and a third navigation device 5Z, a first dialogue device 10X, a second dialogue device 10Y, and a third dialogue device 10Z, and a server 12. The first dialogue device 10X, the second dialogue device 10Y and the third dialogue device 10Z and the server 12 are interconnected via a predetermined network 14. The first dialogue device 10X, the second dialogue device 10Y, and the third dialogue device 10Z are an example of plural voice output devices.

Figure 2:
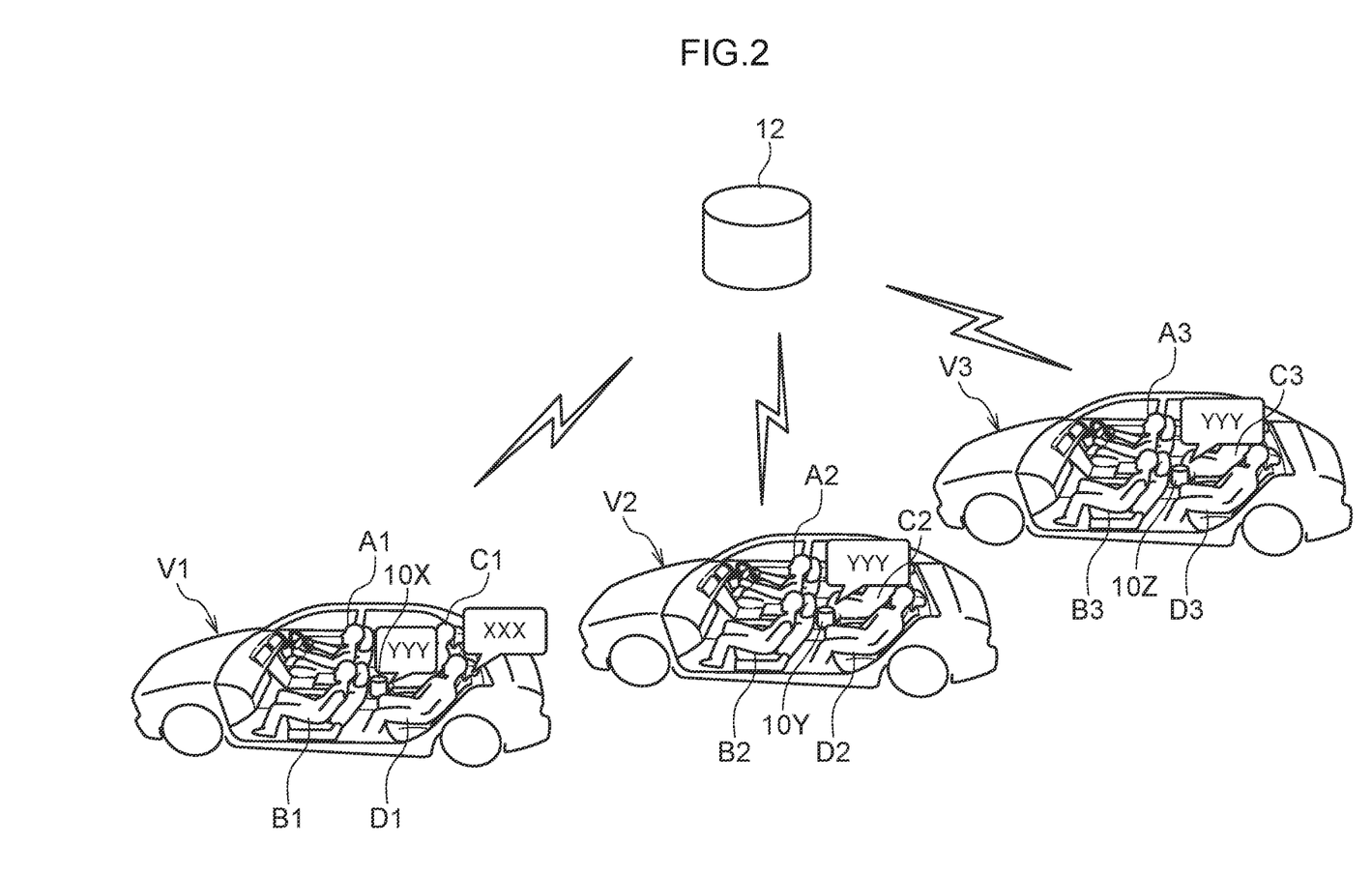
FIG. 2 is an explanatory diagram for a description of an outline of the first embodiment.

As illustrated in FIG. 2, the first dialogue device 10X, the second dialogue device 10Y, and the third dialogue device 10Z are installed in a vehicle V1, a vehicle V2, and a vehicle V3, respectively. Passengers A1, B1, C1, and D1 are on board the vehicle V1. Passengers A2, B2, C2, and D2 are on board the vehicle V2. Passengers A3, B3, C3, and D3 are on board the vehicle V3.

The vehicles V1 to V3 are plural vehicles that have the same current destination. For example, when plural persons make a journey and the like, the plurality of persons are required to, by separating into groups, be on board the vehicles V1 to V3 in a case in which one vehicle cannot accommodate the plurality of persons. In this case, when there is a place to stop by on the way to a destination, information may be shared among the vehicles V1 to V3. For example, sharing information such as where to have a meal at a mealtime among the vehicles V1 to V3 makes it unnecessary for passengers who are on board different vehicles to communicate with one another by mobile phones or the like.

In some embodiments, a proposition and the like of a place to stop by is made according to a current destination and a past destination. For example, in a case in which there exists a reputable restaurant on a route to the current destination and an utterance "Find a restaurant where we can have a meal" is submitted by a passenger in one of the vehicles, proposing the restaurant is conceivable. In a case in which there exists a destination that was visited in the past on a route to the current destination, making a proposition according to the past destination is conceivable.

Accordingly, the dialogue device of the embodiment generates proposition information that is an utterance indicating a proposition for passengers in vehicles according to a current destination and a past destination. For example, in a case in which, as illustrated in FIG. 2, the passenger D1 in the vehicle V1 submitted an utterance "XXX", the first dialogue device 10X generates proposition information "YYY" and outputs the proposition information to the passengers A1 to D1 in the vehicle V1. The first dialogue device 10X transmits the proposition information "YYY" to the second dialogue device 10Y and the third dialogue device 10Z via the server 12. The second dialogue device 10Y outputs the proposition information "YYY" to the passengers A2 to D2 in the vehicle V2. The third dialogue device 10Z outputs the proposition information "YYY" to the passengers A3 to D3 in the vehicle V3. This configuration causes proposition information to be shared among plural vehicles in a case in which the plurality of vehicles are on the way to the same destination. Hereinafter, a specific description will be made.

<Server>

The server 12 is configured including a central processing unit (CPU), a read only memory (ROM) storing a program and the like for achieving respective processing routines, a random access memory (RAM) storing data temporarily, a memory serving as a storage means, a network interface, and the like.

The server 12 sets a group for the first dialogue device 10X mounted in the vehicle V1, the second dialogue device 10Y mounted in the vehicle V2, and the third dialogue device 10Z mounted in the vehicle V3. For example, the server 12 receives control signals transmitted by the first dialogue device 10X, the second dialogue device 10Y, and the third dialogue device 10Z and groups the first dialogue device 10X, the second dialogue device 10Y, and the third dialogue device 10Z according to the control signals.

The server 12 mediates transmission and reception of information among the first dialogue device 10X, the second dialogue device 10Y, and the third dialogue device 10Z.

<Navigation Device>

The first navigation device 5X, the second navigation device 5Y, and the third navigation device 5Z are mounted in the vehicle V1, the vehicle V2, and the vehicle V3, respectively. Since the first navigation device 5X, the second navigation device 5Y, and the third navigation device 5Z have the same configuration, a configuration of the first navigation device 5X will be described below.

Figure 3:
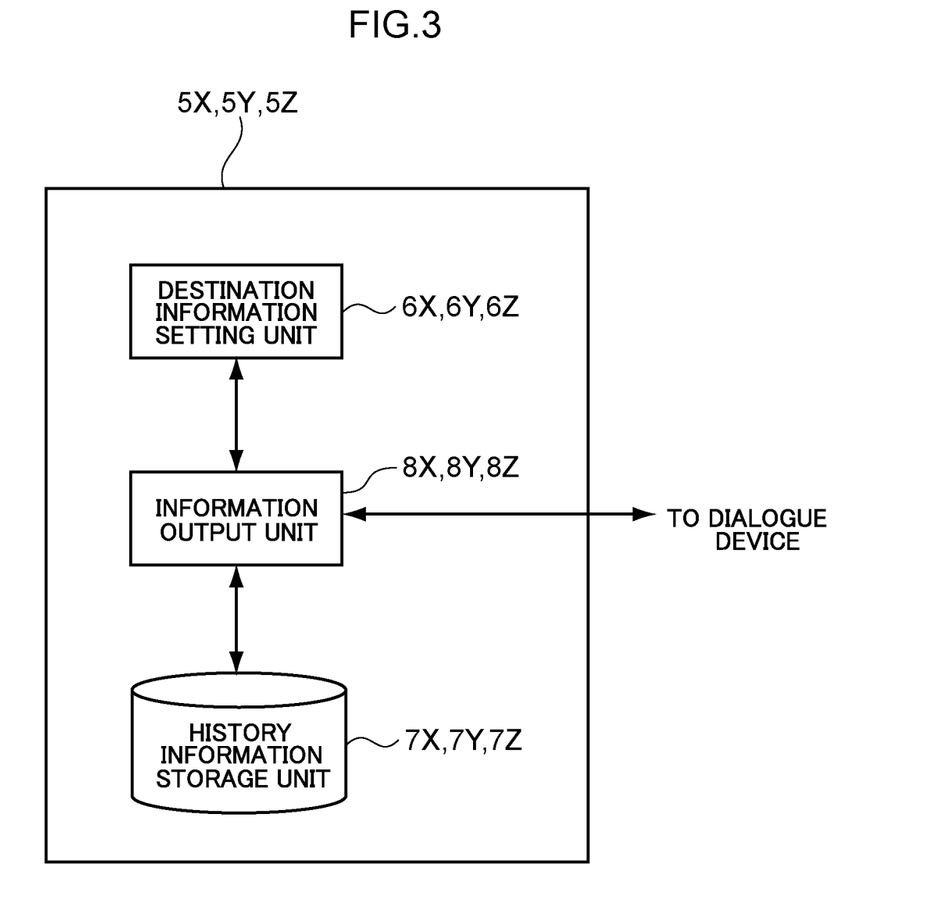
FIG. 3 is a schematic block diagram of a navigation device.

The first navigation device 5X is configured with a computer including a CPU, a ROM storing a program and the like for achieving respective processing routines, a RAM storing data temporarily, a memory serving as a storage means, a network interface, and the like. As illustrated in FIG. 3, the first navigation device 5X functionally includes a destination information setting unit 6X, a history information storage unit 7X, and an information output unit 8X.

The destination information setting unit 6X accepts operation information from the passengers A1 to D1 in the vehicle V1 and generates destination information that indicates a current destination. The vehicle V1 travels to a destination according to the destination information set by the destination information setting unit 6X.

In the history information storage unit 7X, respective pieces of past destination information of the vehicle V1 are stored.

The information output unit 8X outputs current destination information set by the destination information setting unit 6X and past destination information stored in the history information storage unit 7X to the first dialogue device 10X.

<Dialogue Device>

The first dialogue device 10X, the second dialogue device 10Y, and the third dialogue device 10Z are mounted in the vehicle V1, the vehicle V2, and the vehicle V3, respectively. Since the first dialogue device 10X, the second dialogue device 10Y, and the third dialogue device 10Z have the same configuration, a configuration of the first dialogue device 10X will be described below.

The first dialogue device 10X performs a dialogue with the passengers A1 to D1 in the vehicle V1. For example, the first dialogue device 10X plays music in response to an utterance "Play music" submitted by a passenger.

Figure 4:
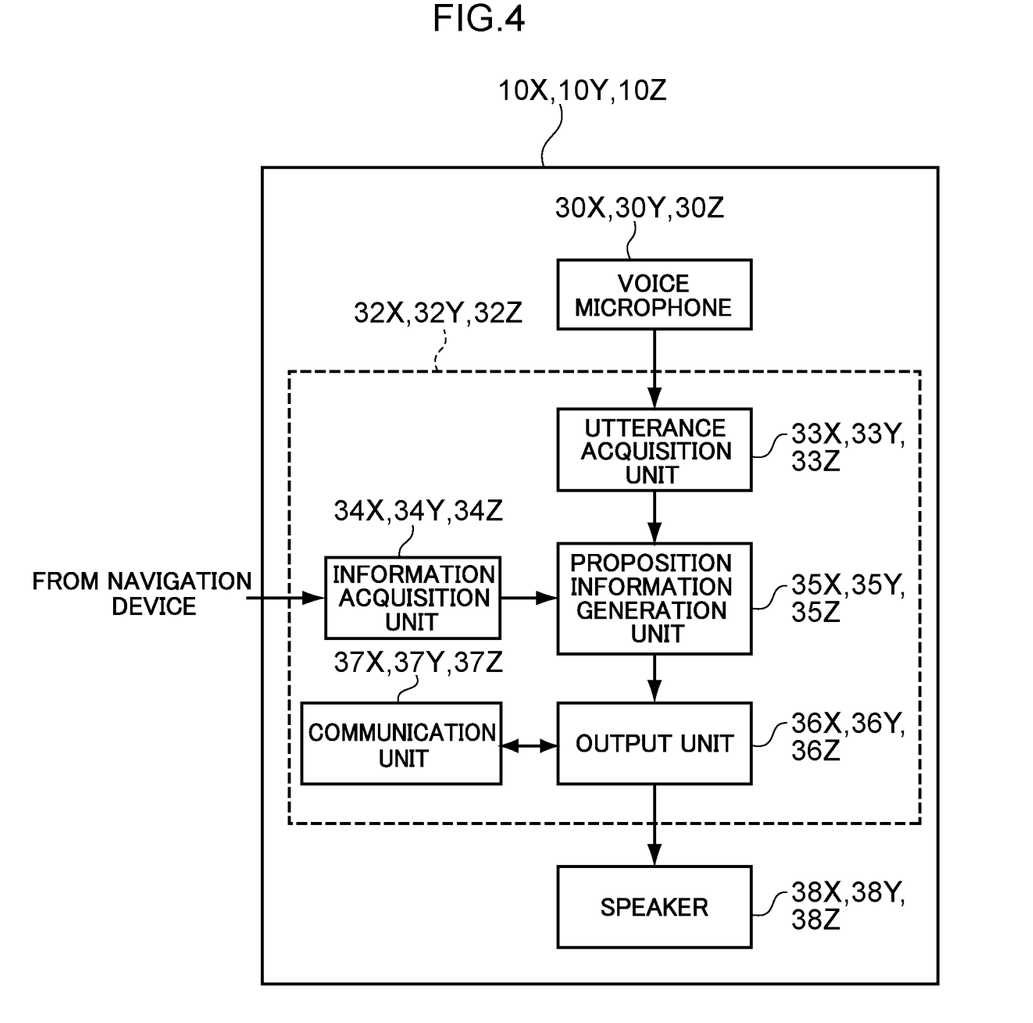
FIG. 4 is a schematic block diagram of a dialogue device.

As illustrated in FIG. 4, the first dialogue device 10X includes a voice microphone 30X, a computer 32X, and a speaker 38X.

The voice microphone 30X detects an utterance from a passenger who is present in a vicinity of the first dialogue device 10X. The voice microphone 30X outputs the detected utterance from the passenger to the computer 32X, which will be described later.

The computer 32X is configured including a CPU, a ROM storing a program and the like for achieving respective processing routines, a RAM storing data temporarily, a memory serving as a storage means, a network interface, and the like. The computer 32X functionally includes an utterance acquisition unit 33X, an information acquisition unit 34X, a proposition information generation unit 35X, an output unit 36X, and a communication unit 37X. The output unit 36X is an example of a first output unit and a second output unit, and the communication unit 37X is an example of a transmission unit and a reception unit. The proposition information generation unit 35X is an example of a generation unit.

The utterance acquisition unit 33X successively acquires an utterance from a passenger detected by the voice microphone 30X.

The information acquisition unit 34X acquires current destination information and past destination information output from the first navigation device 5X.

The proposition information generation unit 35X generates proposition information that is an utterance indicating a proposition for passengers in the vehicles, based on an utterance acquired by the utterance acquisition unit 33X and current destination information and past destination information acquired by the information acquisition unit 34X.

For example, in a case in which conversations like "What are we going to eat for lunch?", "I want to eat udon noodles", "Good idea", and "Is there any good udon noodle restaurant around here or around our destination?" have been made among the passengers A1, B1, C1, and D1 in the vehicle V1, these utterances are acquired by the utterance acquisition unit 33X.

The proposition information generation unit 35X, for example, recognizes that an udon noodle restaurant is required to be proposed based on a combination of words "udon noodles", "want to eat", "good idea", and "udon noodle restaurant" in the utterances acquired by the utterance acquisition unit 33X. The proposition information generation unit 35X, for example, also recognizes that an udon noodle restaurant existing in a vicinity of a current destination or a route to the current destination is required to be proposed based on a combination of words "around here" and "around our destination" in the utterances acquired by the utterance acquisition unit 33X.

The proposition information generation unit 35X, for example, acquires information about an udon noodle restaurant existing in a vicinity of the current destination or a route to the current destination, which was acquired by the information acquisition unit 34X, from a predetermined database (illustration omitted) via the communication unit 37X, which will be described later. The proposition information generation unit 35X generates an utterance including the acquired information about an udon noodle restaurant. For example, the proposition information generation unit 35X generates an utterance like "There is an udon noodle restaurant Y around the destination X. The general reputation of this udon noodle restaurant is Z" as proposition information.

For example, in a case in which conversations like "What are we going to eat for lunch?", "I want to eat udon noodles", "Good idea", and "We have been to a delicious udon noodle restaurant around here before, haven't we?" have been made among the passengers A1, B1, C1, and D1 in the vehicle V1, these utterances are acquired by the utterance acquisition unit 33X.

In this case, the proposition information generation unit 35X, for example, recognizes that an udon noodle restaurant is required to be proposed based on a combination of words "udon noodles", "want to eat", "good idea", and "udon noodle restaurant" in the utterances acquired by the utterance acquisition unit 33X. The proposition information generation unit 35X, for example, recognizes that an udon noodle restaurant that was visited in the past is required to be proposed based on a combination of words "before", "around here", and "udon noodle restaurant" in the utterances acquired by the utterance acquisition unit 33X.

The proposition information generation unit 35X, for example, acquires information about an udon noodle restaurant that was visited in the past from a predetermined database (illustration omitted) via the communication unit 37X, which will be described later, based on past destination information acquired by the information acquisition unit 34X. The proposition information generation unit 35X generates an utterance including the information about the udon noodle restaurant, which was visited in the past. For example, the proposition information generation unit 35X generates an utterance "There is an udon noodle restaurant Y that was visited before around here. The general reputation of this udon noodle restaurant is Z" as proposition information.

The output unit 36X outputs proposition information generated by the proposition information generation unit 35X to the speaker 38X. The output unit 36X also outputs the proposition information, generated by the proposition information generation unit 35X, to the communication unit 37X.

The communication unit 37X transmits proposition information generated by the proposition information generation unit 35X to the second dialogue device 10Y and the third dialogue device 10Z, which are other dialogue devices belonging to the same group, via the server 12.

The speaker 38X outputs by voice proposition information output by the output unit 36X.

The communication unit 37Y in the second dialogue device 10Y and the communication unit 37Z in the third dialogue device 10Z receive proposition information transmitted by the first dialogue device 10X. The output unit 36Y in the second dialogue device 10Y and the output unit 36Z in the third dialogue device 10Z output the proposition information to the speakers 38Y and 38Z, respectively. The proposition information is output by voice from the speakers 38Y and 38Z, as a result of which proposition information is shared among plural vehicles in a case in which the plurality of vehicles head to the same destination.

In a case in which proposition information is generated in the second dialogue device 10Y, the proposition information is transmitted to the first dialogue device 10X and the third dialogue device 10Z, as a result of which proposition information generated by the second dialogue device 10Y is shared. In a case in which proposition information is generated in the third dialogue device 10Z, the proposition information is transmitted to the first dialogue device 10X and the second dialogue device 10Y, as a result of which proposition information generated by the third dialogue device 10Z is shared.

Figure 5:
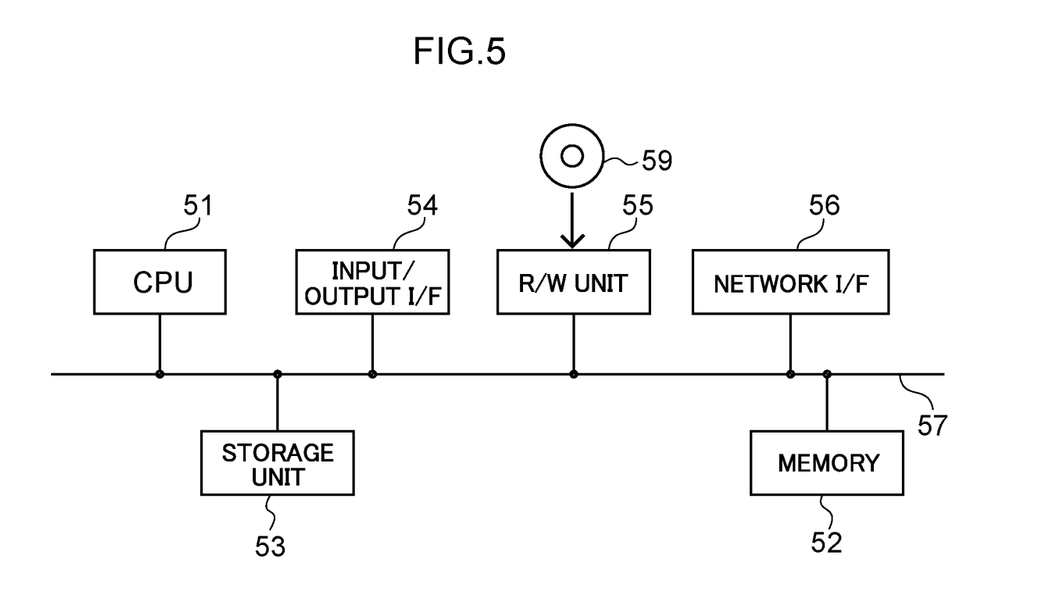
FIG. 5 is a diagram illustrating a configuration example of a computer in each device.

Each of the server 12, the first navigation device 5X, the second navigation device 5Y, the third navigation device 5Z, the computer 32X in the first dialogue device 10X, the computer 32Y in the second dialogue device 10Y, and the computer 32Z in the third dialogue device 10Z is, for example, achieved by a configuration as illustrated in FIG. 5. The computer illustrated in FIG. 5 includes a CPU 51, a memory 52 as a temporary storage area, and a nonvolatile storage unit 53. The computer also includes an input/output interface (I/F) 54 to which an input/output device and the like (illustration omitted) are connected and a read/write (R/W) unit 55 that controls reading and writing of data from and to a recording medium 59. The computer still also includes a network I/F 56 that is connected to a network, such as the Internet. The CPU 51, the memory 52, the storage unit 53, the input/output I/F 54, the R/W unit 55, and the network I/F 56 are interconnected via a bus 57.

The storage unit 53 may be achieved by a hard disk drive (HDD), a solid state drive (SSD), a flash memory, or the like. In the storage unit 53 serving as a storage medium, a program for making the computer function is stored. The CPU 51 reads the program from the storage unit 53, expands the program in the memory 52, and successively executes processes that the program includes. This configuration enables the CPU 51 to function as the destination information setting unit 6X, the history information storage unit 7X, and the information output unit 8X in the first navigation device 5X. The same applies to the second navigation device 5Y and the third navigation device 5Z. In the computer 32X in the first dialogue device 10X, the CPU 51 functions as the utterance acquisition unit 33X, the information acquisition unit 34X, the proposition information generation unit 35X, the output unit 36X, and the communication unit 37X. The same applies to the computer 32Y in the second dialogue device 10Y and the computer 32Z in the third dialogue device 10Z.

Next, operation of the embodiment will be described.

The server 12 receives control signals transmitted by the first dialogue device 10X, the second dialogue device 10Y, and the third dialogue device 10Z and groups the first dialogue device 10X, the second dialogue device 10Y, and the third dialogue device 10Z according to the control signals.

Next, current destination information is input to the first navigation device 5X, the second navigation device 5Y, and the third navigation device 5Z.

Figure 6:
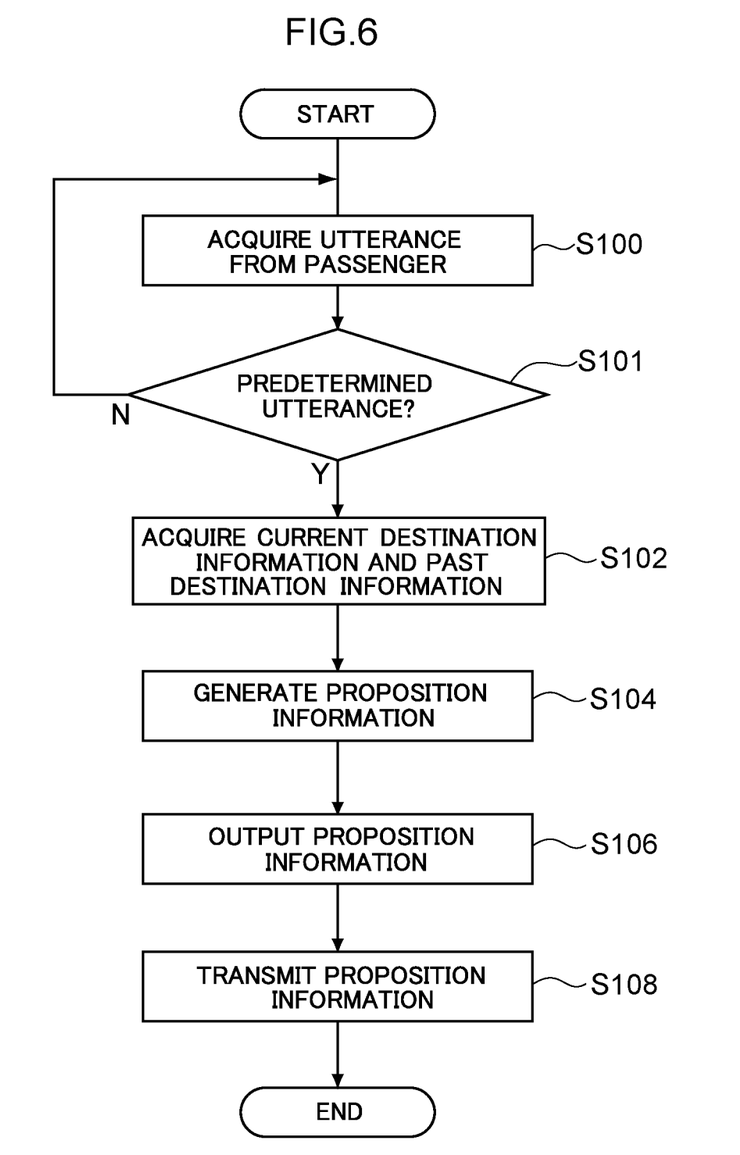
FIG. 6 is a flowchart illustrating an example of processing performed by the dialogue device according to embodiments.

When the vehicles V1, V2, and V3 start to travel and the first dialogue device 10X, the second dialogue device 10Y, and the third dialogue device 10Z start up, the CPU 51 in each of the computer 32X in the first dialogue device 10X, the computer 32Y in the second dialogue device 10Y, and the computer 32Z in the third dialogue device 10Z executes a proposition processing routine illustrated in FIG. 6. The following description will be made taking as an example a proposition processing routine executed by the first dialogue device 10X.

In step S100, the utterance acquisition unit 33X acquires an utterance from a passenger detected by the voice microphone 30X.

In step S101, the utterance acquisition unit 33X determines whether or not the utterance acquired in the above step S100 is a predetermined utterance. In a case in which the utterance acquired in the above step S100 is a predetermined utterance, the process proceeds to step S102. In a case in which the utterance acquired in the above step S100 is not a predetermined utterance, the process returns to step S100. As predetermined utterances, utterances such as "want to eat", "meal", or "lunch" are registered in advance. This processing enables proposition information to be suppressed from being generated every time an utterance is submitted by a passenger.

In step S102, the information acquisition unit 34X acquires current destination information and past destination information from the first navigation device 5X.

In step S104, the proposition information generation unit 35X generates proposition information, based on the utterance acquired in the above step S100 and the current destination information and the past destination information acquired in the above step S102.

In step S106, the output unit 36X outputs the proposition information generated in the above step S104 to the speaker 38X. The speaker 38X outputs by voice the proposition information output by the output unit 36X.

In step S108, the communication unit 37X transmits the proposition information generated in the above step S104 to the second dialogue device 10Y and the third dialogue device 10Z via the server 12.

Figure 7:
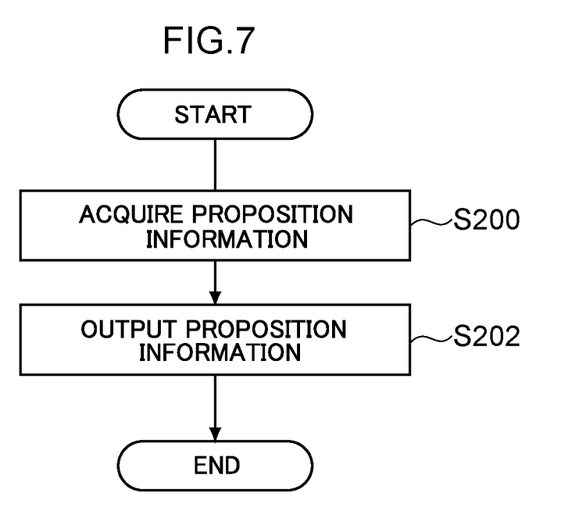
FIG. 7 is a flowchart illustrating an example of other processing performed by the dialogue device according to the embodiments.

When, after the proposition information has been transmitted from the first dialogue device 10X, the communication unit 37Y in the second dialogue device 10Y and the communication unit 37Z in the third dialogue device 10Z receive the proposition information transmitted by the first dialogue device 10X, the second dialogue device 10Y and the third dialogue device 10Z execute a processing routine illustrated in FIG. 7. The following description will be made taking as an example a processing routine executed by the second dialogue device 10Y.

In step S200, the output unit 36Y acquires the proposition information received by the communication unit 37Y.

In step S202, the output unit 36Y outputs the proposition information acquired in the above step S200 to the speaker 38Y. The speaker 38Y outputs by voice the proposition information output by the output unit 36Y.

The processing routine illustrated in FIG. 7 is also executed by the third dialogue device 10Z in a similar manner.

As described thus far, the voice output system according to the first embodiment includes plural dialogue devices interconnected via a network, and each dialogue device generates proposition information that is an utterance indicating a proposition for passengers in vehicles, based on utterances from passengers and current destination information and past destination information. Each dialogue device outputs the proposition information inside the vehicle in which the dialogue device itself is mounted and, in conjunction therewith, transmits the proposition information to other dialogue devices. Each of the other dialogue devices outputs the received proposition information inside the vehicle in which the dialogue device itself is mounted. This operation enables proposition information for passengers who are on board plural vehicles to be shared appropriately among the plurality of vehicles the current destinations of which correspond to one another.

In the voice output system according to the first embodiment, a group of dialogue devices each of which is mounted in one of plural vehicles the destinations of which correspond to one another is defined by the server 12. Proposition information generated in a specific dialogue device is transmitted to other dialogue devices belonging to the same group. This operation enables information to be shared appropriately through proposition information output from one of the dialogue devices belonging to the same group. Information of a destination and information exchanged inside a vehicle according to proposition information are shared appropriately.

Second Embodiment

Next, a voice output system according to a second embodiment will be described. The same signs are assigned to the same constituent components as those in the first embodiment and a description thereof will be omitted.

The voice output system of the second embodiment differs from the voice output system of the first embodiment in that the voice output system of the second embodiment includes a dialogue device installed at a place different from vehicles.

Figure 8:
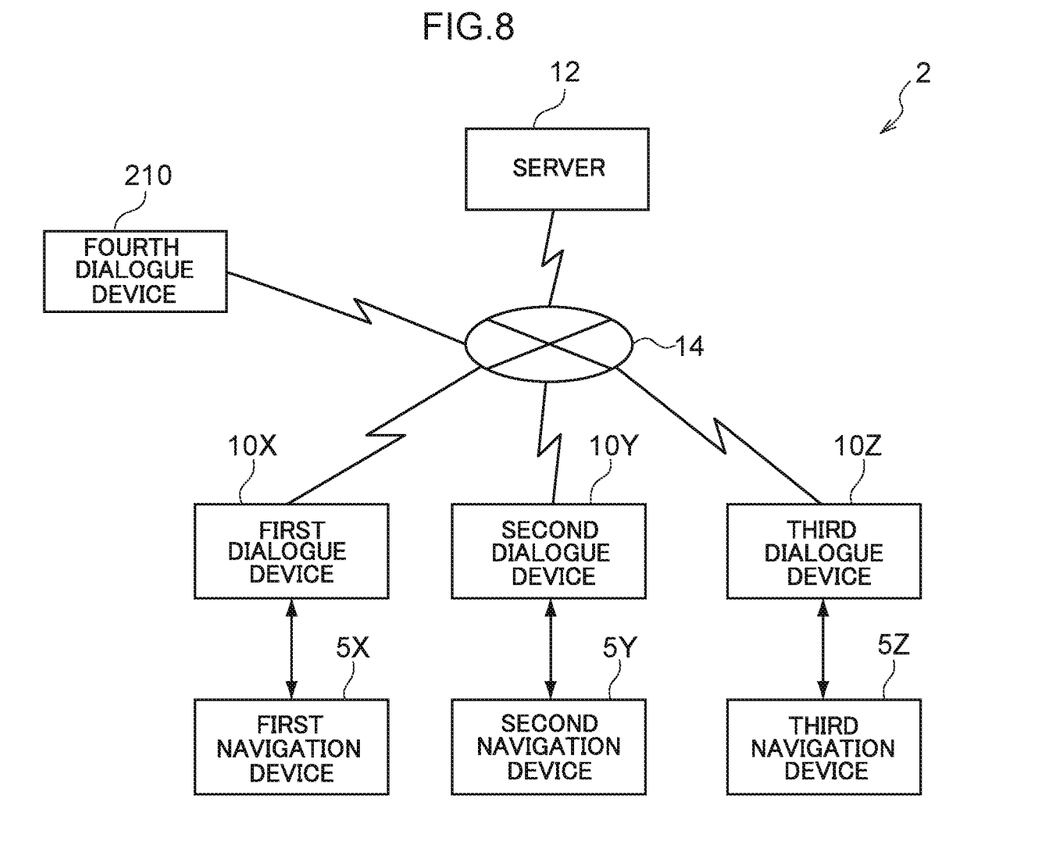
FIG. 8 is a schematic block diagram of a voice output system according to a second embodiment.

As illustrated in FIG. 8, a voice output system 2 includes a first navigation device 5X, a second navigation device 5Y, and a third navigation device 5Z, a first dialogue device 10X, a second dialogue device 10Y, a third dialogue device 10Z, and a fourth dialogue device 210, and a server 12.

Figure 9:
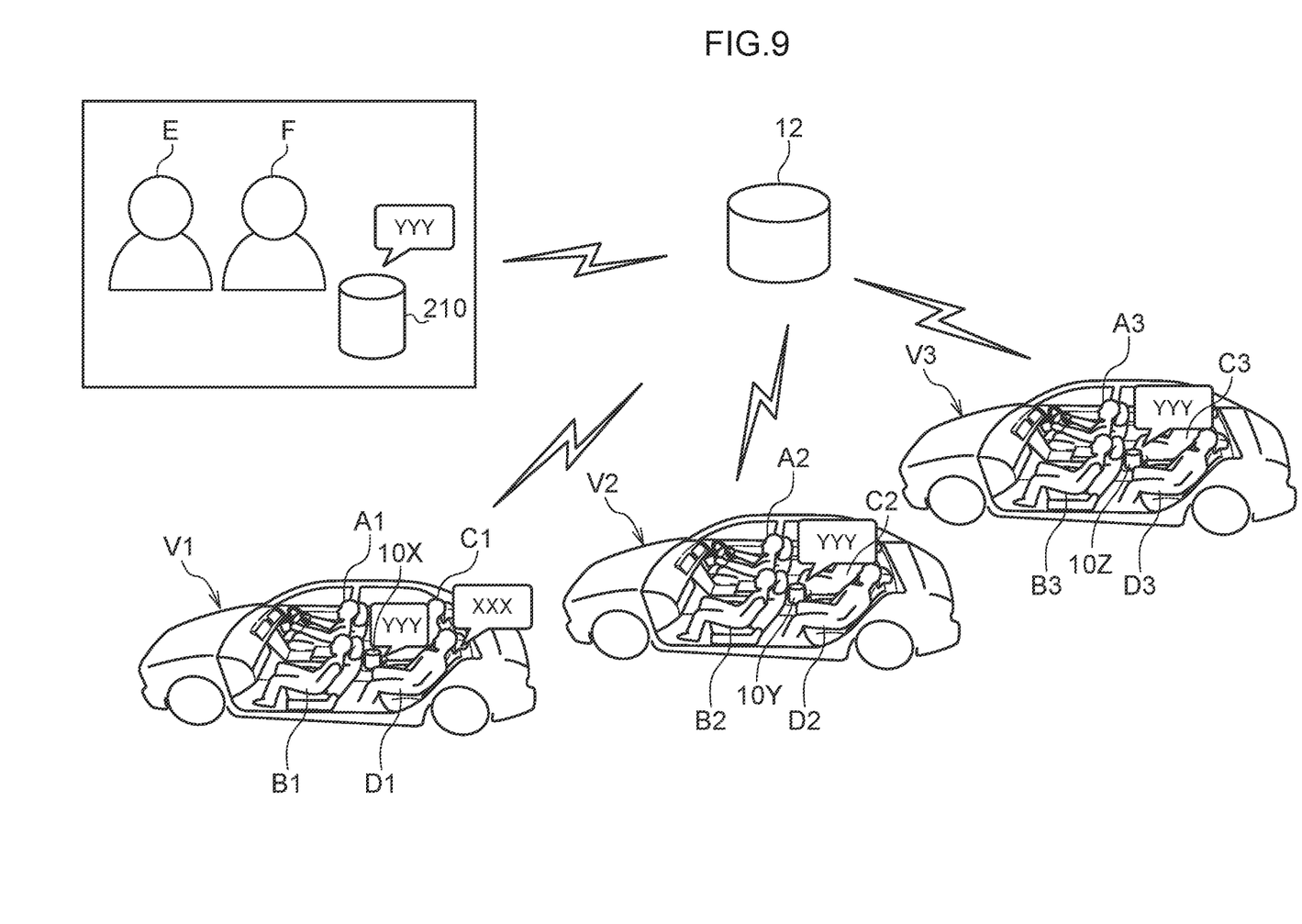
FIG. 9 is an explanatory diagram for a description of an outline of the second embodiment.

As illustrated in FIG. 9, the fourth dialogue device 210 is installed at a place different from vehicles. A detailed configuration of the fourth dialogue device 210 is the same as those of the first dialogue device 10X, the second dialogue device 10Y, and the third dialogue device 10Z.

As illustrated in FIG. 9, when, for example, plural persons make a journey and the like, the persons head to a destination using vehicles V1 to V3. Meanwhile, users E and F are users who do not participate in the journey. However, there is a case in which the users E and F want to feel as if they also participated in the journey.

Accordingly, in the embodiment, information sharing is performed between passengers in the vehicles V1 to V3 and the users E and F, who are not on board the vehicles, using the fourth dialogue device 210, which is installed at a place different from the vehicles.

For example, in a case in which the user E has submitted an utterance "I remember that I have been to a place called T around there before", the fourth dialogue device 210 acquires the utterance. The fourth dialogue device 210 generates proposition information according to the utterance submitted by the user E. The proposition information generated by the fourth dialogue device 210 is transmitted to the first dialogue device 10X, the second dialogue device 10Y, and the third dialogue device 10Z via the server 12, and the proposition information is output in the vehicles V1 to V3.

This configuration enables information to be shared appropriately between a user at a remote place and passengers in vehicles using a dialogue device installed at a place different from the vehicles.

Since other components and operation of the fourth dialogue device 210 according to the second embodiment are the same as those in the first embodiment, a description thereof will be omitted.

As described thus far, in the voice output system according to the second embodiment, the respective ones of plural dialogue devices are installed in vehicles and at a place different from the vehicles. This configuration enables information to be shared appropriately between a user at a remote place and passengers in the vehicles. Information about a place that was visited in the past and the like is also shared between the user at a remote place and the passengers in the vehicles.

Although the processing performed by the dialogue devices in the embodiments described above was described as software processing performed by executing a program, the processing may be configured to be performed by hardware. Alternatively, the processing may be configured to be performed by a combination of both software and hardware. The program to be stored in the ROM may be distributed stored in various types of storage media.

The present disclosure is not limited to the above embodiments, and it is needless to say that various modifications other than those described above may be made and implemented without departing from the subject matter of the present disclosure.

For example, each of dialogue devices in the embodiments described above may be achieved by a mobile terminal and the like.

What is claimed is:

1. A voice output system comprising a plurality of voice output devices that are interconnected via a network,
    wherein each of the plurality of voice output devices is mounted in a different one of a plurality of vehicles, and
    wherein each of the plurality of voice output devices includes:
        a memory; and
        a processor coupled to the memory and configured to:
            acquire an utterance from a passenger who is on board one of the plurality of vehicles;
            generate proposition information that is an utterance indicating a proposition for respective passengers who are on board the plurality of vehicles, based on the acquired utterance and at least one of current destination information or past destination information of the plurality of vehicles;
            output the generated proposition information;
            transmit the generated proposition information to other voice output device that is mounted in a vehicle, which has a common current destination information;
            receive the proposition information transmitted from the other voice output device; and
            output the received proposition information.

2. The voice output system according to claim 1, further comprising a further voice output device that is installed at a place different from the plurality of vehicles,
  wherein the processor in the further voice output device is further configured to acquire an utterance from a user in a vicinity of the further voice output device.

3. A non-transitory storage medium storing a program that is executed in each of a plurality of voice output devices, each of which is mounted in a different one of a plurality of vehicles, the program causing a computer to execute processing comprising:
  acquiring an utterance from a passenger who is on board one of the plurality of vehicles;
  generating proposition information that is an utterance indicating a proposition for respective ones of the passengers who are on board the plurality of vehicles, based on the acquired utterance and at least one of current destination information or past destination information of the plurality of vehicles;
  outputting the generated proposition information;
  transmitting the generated proposition information to other voice output device that is mounted in a vehicle, which has a common current destination information;
  receiving proposition information transmitted from the other voice output device; and
  outputting the received proposition information.

4. A voice output method that is performed in each of a plurality of voice output devices, each of which is mounted in a different one of a plurality of vehicles, the method comprising:
  acquiring an utterance from a passenger who is on board one of the plurality of vehicles;
  generating proposition information that is an utterance indicating a proposition for respective passengers who are on board the plurality of vehicles, based on the acquired utterance and at least one of current destination information or past destination information of the plurality of vehicles;
  outputting the generated proposition information;
  transmitting the generated proposition information to other voice output device that is mounted in a vehicle, which has a common current destination information;
  receiving the proposition information transmitted from the other voice output device; and
  outputting the received proposition information.

* * * * *